US011254519B1

(12) United States Patent
Harris

(10) Patent No.: US 11,254,519 B1
(45) Date of Patent: Feb. 22, 2022

(54) VEHICLE WASTE DISPOSAL SYSTEM

(71) Applicant: Garry Harris, Lonoke, AR (US)

(72) Inventor: Garry Harris, Lonoke, AR (US)

( * ) Notice: Subject to any disclaimer, the term of this patent is extended or adjusted under 35 U.S.C. 154(b) by 0 days.

(21) Appl. No.: 17/367,558

(22) Filed: Jul. 5, 2021

(51) Int. Cl.
  *B65G 67/24* (2006.01)
  *B65G 53/06* (2006.01)
  *B65G 53/66* (2006.01)
  *B65F 1/14* (2006.01)
  *B65F 5/00* (2006.01)

(52) U.S. Cl.
  CPC ............ *B65G 53/06* (2013.01); *B65F 1/1405* (2013.01); *B65F 5/005* (2013.01); *B65G 53/66* (2013.01); *B65F 2210/168* (2013.01); *B65F 2210/182* (2013.01)

(58) Field of Classification Search
  CPC ........ B65G 53/06; B65G 53/66; B65G 67/24; B65G 2210/186; B60R 7/00; B60R 7/04; B60R 15/00; B60R 2011/0003
  USPC ............... 406/19, 31, 39, 43, 44; 180/89.11; 15/313; 296/37.8
  See application file for complete search history.

(56) References Cited

U.S. PATENT DOCUMENTS

| | | | | |
|---|---|---|---|---|
| 2,680,569 A * | 6/1954 | Nicholas | ................ | B60N 3/086 241/55 |
| 2,764,281 A * | 9/1956 | Mendenhall | ........... | B60N 3/086 180/89.11 |
| 2,823,799 A * | 2/1958 | Gangell | ................. | B60N 3/086 209/680 |
| 2,891,662 A * | 6/1959 | Frost | ..................... | A47L 7/0071 180/89.11 |
| 3,011,627 A * | 12/1961 | Frost | ..................... | B60N 3/086 180/89.11 |
| 3,230,567 A * | 1/1966 | Nickless | ................ | B60N 3/086 15/313 |
| 3,250,382 A * | 5/1966 | Beil | ....................... | B60N 3/086 180/89.11 |
| 3,500,492 A * | 3/1970 | Joe | ......................... | B60N 3/086 180/89.11 |
| 3,514,007 A * | 5/1970 | Woods, Sr. | ........... | B65F 1/1468 220/23.88 |
| 3,648,837 A * | 3/1972 | Ogle | ...................... | B60N 3/086 180/89.11 |
| 3,929,060 A * | 12/1975 | Burke | .................. | B65F 1/1405 100/100 |

(Continued)

*Primary Examiner* — Joseph A Dillon, Jr.
(74) *Attorney, Agent, or Firm* — The Iwashko Law Firm, PLLC; Lev Ivan Gabriel Iwashko

(57) ABSTRACT

A vehicle waste disposal system connected to a vehicle, the vehicle waste disposal system including a waste receiving container connected within a passenger compartment of the vehicle to receive at least one waste item therein, a waste storage container connected within a trunk of the vehicle to receive the at least one waste item from the waste receiving container and store the at least one waste item therein, a pipe connected at a first end to at least a portion of the waste receiving container and connected at a second end to at least a portion of the waste storage container, and an air dispensing unit connected to at least a portion of the waste receiving container and the pipe to move the at least one waste item from the waste receiving container to the waste storage container in response to extracting air from the waste receiving container and expelling the air into the pipe toward the waste storage container.

5 Claims, 3 Drawing Sheets

(56) References Cited

U.S. PATENT DOCUMENTS

| | | | | | |
|---|---|---|---|---|---|
| 3,998,385 | A * | 12/1976 | Ogle | | B60H 1/00507 237/12.3 B |
| 4,072,097 | A * | 2/1978 | Seibel | | B60N 3/08 100/100 |
| 4,715,618 | A * | 12/1987 | Harris | | A01K 27/002 119/771 |
| 4,796,926 | A * | 1/1989 | Rapsilver | | E03F 1/008 141/311 R |
| 5,040,099 | A * | 8/1991 | Harris | | B60Q 1/2676 362/473 |
| 5,829,091 | A * | 11/1998 | Ingram | | A47L 5/38 15/313 |
| 6,036,446 | A * | 3/2000 | Goodman | | F01M 11/045 137/15.05 |
| 6,128,804 | A * | 10/2000 | Lee | | B60N 3/086 15/313 |
| 6,148,472 | A * | 11/2000 | Arena | | A47L 9/108 15/313 |
| 6,582,002 | B2 * | 6/2003 | Hogan | | B60N 3/08 220/495.06 |
| 7,000,532 | B2 * | 2/2006 | Imperato | | B30B 1/36 100/100 |
| 7,015,799 | B1 * | 3/2006 | Kitano | | B60R 7/04 180/89.11 |
| 7,152,272 | B2 * | 12/2006 | Rukavina | | A47L 7/0076 15/313 |
| 7,266,859 | B2 * | 9/2007 | Slone | | B60S 1/64 15/313 |
| 9,937,900 | B2 * | 4/2018 | Logli, Jr | | B60S 1/64 |
| 10,328,907 | B2 * | 6/2019 | Williams | | B60S 1/64 |
| 10,433,685 | B2 * | 10/2019 | Rogers | | A47L 9/2857 |
| 2005/0284729 | A1 * | 12/2005 | LoRusso | | B60R 11/00 198/301 |
| 2008/0224461 | A1 * | 9/2008 | Allen | | B60R 11/00 280/830 |
| 2009/0096240 | A1 * | 4/2009 | Hanzel | | B60N 3/08 296/37.8 |
| 2011/0163580 | A1 * | 7/2011 | Lucas | | B60N 2/5635 297/217.1 |

* cited by examiner

VEHICLE WASTE DISPOSAL SYSTEM

BACKGROUND

1. Field

The present general inventive concept relates generally to waste disposal, and particularly, to a vehicle wastes disposal system.

2. Description of the Related Art

While traveling in a vehicle, some people will throw their trash out a window rather than locate a designated trash receptacle. Although littering is punishable by law, it does not deter people from committing these crimes. Aside from the legal ramifications, littering is detrimental to the environment and has some impact on climate change.

Unfortunately, modern vehicles do not have any means of trash disposal. As such, people will bring a bag within the vehicle to store their trash. However, if there is no bag in the vehicle, people will use other alternatives, as discussed above.

Therefore, there is a need for a vehicle waste disposal system located within the vehicle to receive and store trash therein.

SUMMARY

The present general inventive concept provides a vehicle waste disposal system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle waste disposal system connected to a vehicle, the vehicle waste disposal system including a waste receiving container connected within a passenger compartment of the vehicle to receive at least one waste item therein, a waste storage container connected within a trunk of the vehicle to receive the at least one waste item from the waste receiving container and store the at least one waste item therein, a pipe connected at a first end to at least a portion of the waste receiving container and connected at a second end to at least a portion of the waste storage container, and an air dispensing unit connected to at least a portion of the waste receiving container and the pipe to move the at least one waste item from the waste receiving container to the waste storage container in response to extracting air from the waste receiving container and expelling the air into the pipe toward the waste storage container.

The waste storage container may include a sensor to detect a volume of the at least one waste item within the waste storage container and prevents the waste storage container from receiving another at least one waste item until the waste storage container is emptied.

The sensor may disable the air dispensing unit from operating in response to the sensor detecting the waste storage container is full.

The vehicle waste disposal system may further include a compactor disposed within at least a portion of the waste storage container to compress the at least one waste item within the waste storage container.

The vehicle waste disposal system may further include a control unit connected to the waste receiving container to control at least one of the waste receiving container, the air dispensing unit, and the compactor.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
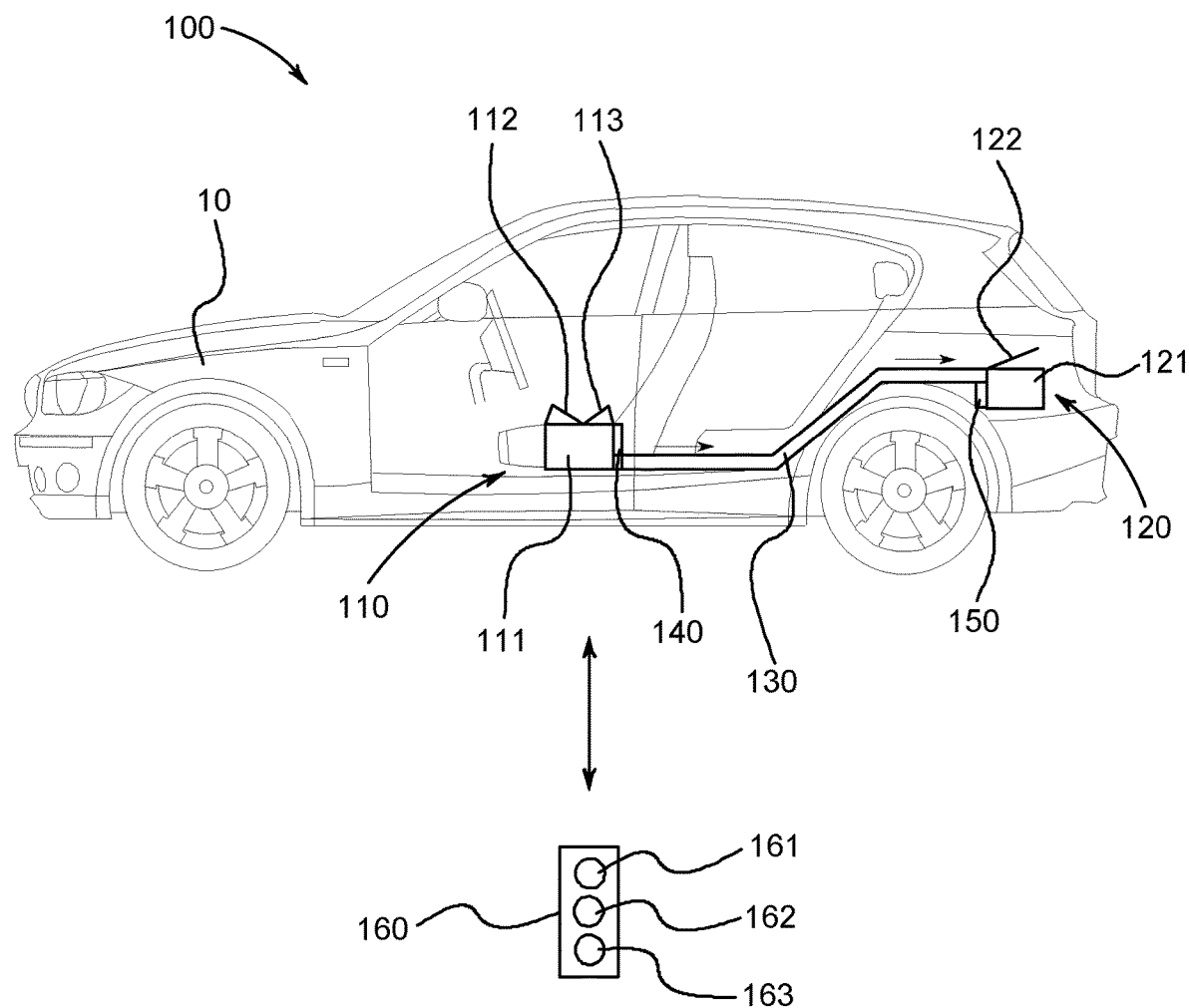
FIG. 1 illustrates a perspective view of a vehicle waste disposal system, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Vehicle Waste Disposal System 100
Waste Receiving Container 110
Receiver Body 111
First Lid 112
Second Lid 113
Waste Storage Container 120
Storage Body 121
Storage Lid 122
Sensor 123
Pipe 130
Air Dispensing Unit 140
Compactor 150
Control Unit 160
Lid Control Button 161
Air Control Button 162
Compactor Button 163

FIG. 1 illustrates a perspective view of a vehicle waste disposal system 100, according to an exemplary embodiment of the present general inventive concept.

The vehicle waste disposal system 100 may be constructed from at least one of metal, plastic, wood, and rubber, etc., but is not limited thereto.

The vehicle waste disposal system 100 may include a waste receiving container 110, a waste storage container 120, a pipe 130, an air dispensing unit 140, a compactor 150, and a control unit 160, but is not limited thereto.

Figure 2:
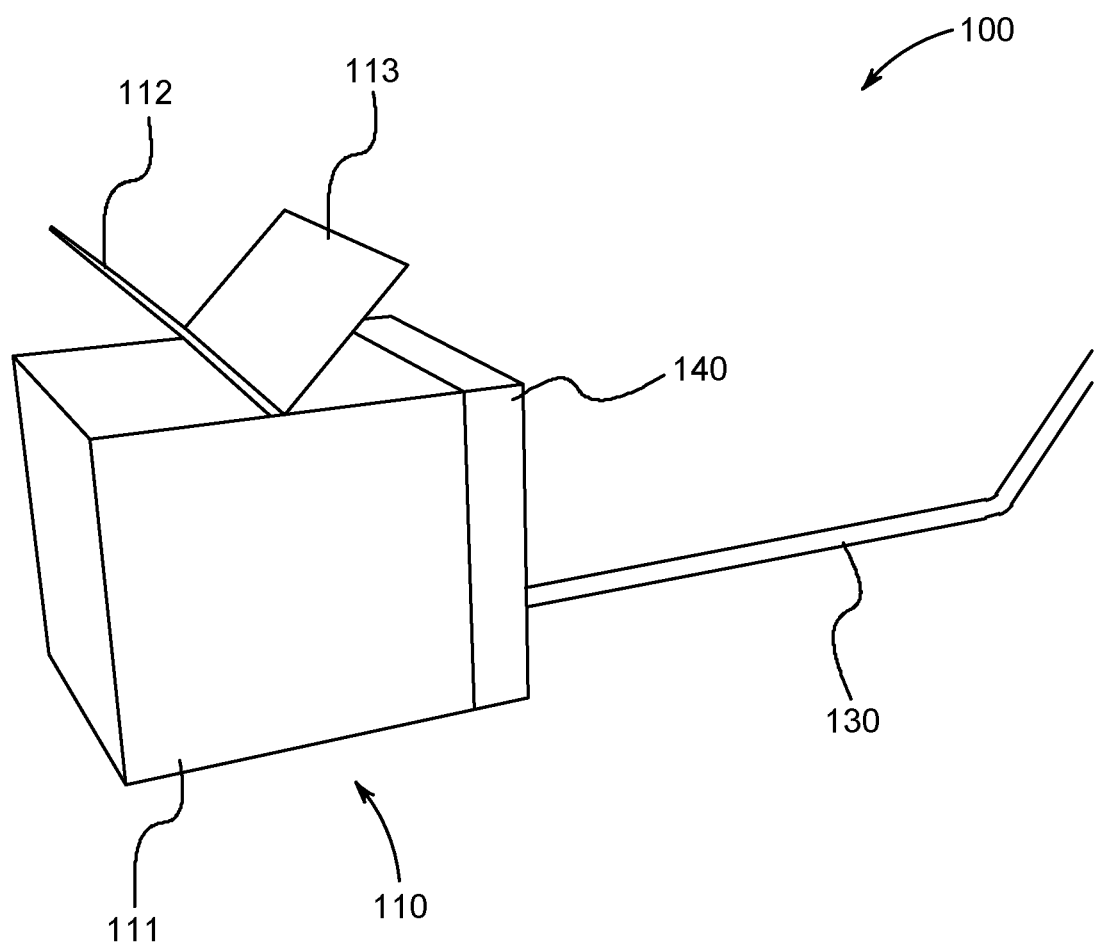
FIG. 2 illustrates a zoomed in view of a waste receiving container, according to an exemplary embodiment of the present general inventive concept.

FIG. 2 illustrates a zoomed in view of a waste receiving container 110, according to an exemplary embodiment of the present general inventive concept.

The waste receiving container 110 may include a receiver body 111, a first lid 112, and a second lid 113, but is not limited thereto.

Referring to FIG. 2, the receiver body 111 is illustrated to have a rectangular prism shape. However, the receiver body 111 may be rectangular, circular, conical, triangular, pentagonal, hexagonal, heptagonal, octagonal, or any other shape known to one of ordinary skill in the art, but is not limited thereto.

The receiver body 111 may be removably connected within at least a portion of a vehicle 10. More specifically, the receiver body 111 may be removably connected using a magnet, a snap, an adhesive (e.g., tape, glue), a cord, and/or any combination thereof. As such, the receiver body 111 may be easily connected and/or detached without use of a screw, a bolt, a nut, etc. that requires more time and use of an external tool for use.

Moreover, the receiver body 111 may be mounted anywhere within the vehicle 10, such as in a passenger compartment of the vehicle 10 next to a seat of a driver. The receiver body 111 may receive at least one waste item therein.

Referring to FIGS. 1 and 2, the first lid 112 may be hingedly disposed on at least a portion of the receiver body 111, such as a center of a top side of the receiver body 111. Moreover, the first lid 112 may move (i.e. pivot and/or rotate) from closed over an interior of the receiver body 111 in a first position to at least partially opened away from the receiver body 111 in a second position. Conversely, the first lid 112 may move from opened away from the receiver body 111 in the second position to closed over the interior of the receiver body 111 in the first position.

Referring again to FIGS. 1 and 2, the second lid 113 may be hingedly disposed on at least a portion of the receiver body 111, such as the center of the top side of the receiver body 111. Moreover, the second lid 113 may move (i.e. pivot and/or rotate) from closed over the interior of the receiver body 111 in a first position to at least partially opened away from the receiver body 111 in a second position. Conversely, the second lid 113 may move from opened away from the receiver body 111 in the second position to closed over the interior of the receiver body 111 in the first position.

Furthermore, the first lid 112 and/or the second lid 113 may be connected at a hinge at the center of the top side of the receiver body 111. Also, referring again to FIG. 2, the first lid 112 and/or the second lid 113 may move (e.g., open) toward the center of the receiver body 111, such that the first lid 112 and/or the second lid 113 form a V-shape. Additionally, the first lid 112 and/or the second lid 113 may close in opposite directions toward the receiver body 111. As such, the interior of the receiver body 111 may be accessed on a first side and/or a second side of the receiver body 111 opposite with respect to the first side. Accordingly, a first user (e.g., a driver) and/or a second user (e.g., a passenger) may access the receiver body 111 from different sides thereof while the first lid 112 and/or the second lid 113 is opened. The first lid 112 and/or the second lid 113 may be powered by a connection to a power source (e.g., a battery) of the vehicle 10.

Figure 3:
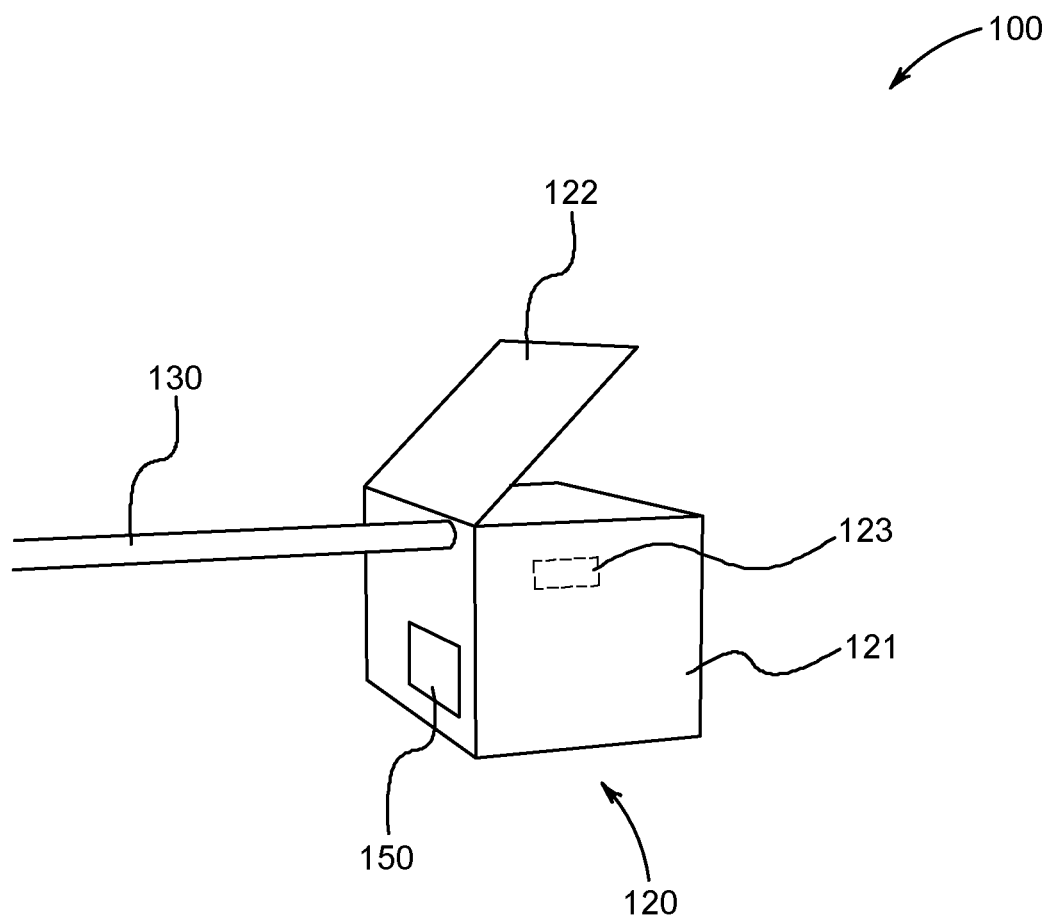
FIG. 3 illustrates a zoomed in view of a waste storage container, according to an exemplary embodiment of the present general inventive concept.

FIG. 3 illustrates a zoomed in view of a waste storage container 120, according to an exemplary embodiment of the present general inventive concept.

The waste storage container 120 may include a storage body 121, a storage lid 122, and a sensor 123, but is not limited thereto.

Referring to FIG. 3, the storage body 121 is illustrated to have a rectangular prism shape. However, the storage body 121 may be rectangular, circular, conical, triangular, pentagonal, hexagonal, heptagonal, octagonal, or any other shape known to one of ordinary skill in the art, but is not limited thereto.

The storage body 121 may be removably connected within at least a portion of the vehicle 10. More specifically, the storage body 121 may be removably connected using a magnet, a snap, an adhesive (e.g., tape, glue), a cord, and/or any combination thereof. As such, the storage body 121 may be easily connected and/or detached without use of a screw, a bolt, a nut, etc. that requires more time and use of an external tool for use.

Moreover, the storage body 121 may be mounted anywhere within the vehicle 10, such as in a trunk of the vehicle 10. The storage body 121 may store the at least one waste item therein. As such, the storage body 121 may keep the at least one waste item away from a passenger compartment of the vehicle 10.

Referring to FIGS. 1 and 3, the storage lid 122 may be hingedly disposed on at least a portion of the storage body 121, such as an edge of a top side of the storage body 121. Moreover, the storage lid 122 may move (i.e. pivot and/or rotate) from closed over an interior of the storage body 121 in a first position to at least partially opened away from the storage body 121 in a second position. Conversely, the storage lid 122 may move from opened away from the storage body 121 in the second position to closed over the interior of the storage body 121 in the first position. Also, the storage lid 122 may be powered by a connection to the power source (e.g., a battery) of the vehicle 10.

As a result, the at least one waste item within the interior of the storage body 121 may be extracted and/or removed for disposal in an external receptacle. Optionally, the storage body 121 may use the sensor 123 disposed within the storage body 121 to detect a volume of the at least one waste item therein, such that the storage body 121 may prevent receiving another at least one waste item until the storage body 121 is emptied.

The pipe 130 may be removably connected at a first end to at least a portion of the receiver body 111 and/or removably connected at a second end to at least a portion of the storage body 121. Thus, the pipe 130 may connect the receiver body 111 to the storage body 121. Therefore, the storage body 121 may receive the at least one waste item from the receiver body 111.

The air dispensing unit 140 may include a vacuum, a blower, a fan, and a pneumatic air compressor, but is not limited thereto.

The air dispensing unit 140 may be connected to at least a portion of the receiver body 111, the storage body 121, and/or the pipe 130. The air dispensing unit 140 may extract air from the receiver body 111 and/or expel the air into the pipe 130 toward the storage body 121. As such, the air dispensing unit 140 may move the at least one waste item from the receiver body 111 through the pipe 130 into the storage body 121. In other words, the air dispensing unit 140 may move the at least one waste item from the receiver body 111 to the storage body 121 in response to extracting air from the receiver body 111 and expelling the air into the pipe 130 toward the storage body 121. The air dispensing unit 140 may be powered by a connection to the power source of the vehicle 10.

It is important to note that the sensor 123 within the storage body 121 may be connected to the air dispensing unit 140 and disable and/or prevent the air dispensing unit 140 from operating in response to the sensor 123 detecting the storage body 121 is full.

The compactor 150 may include a motor and a piston, but is not limited thereto.

The compactor 150 may be disposed on and/or within at least a portion of the storage body 121. The compactor 150 may compress the at least one waste item within the storage body 121. Moreover, the compactor 150 may reduce a volume of the at least one waste item within the storage body 121. As such, the at least one waste item may be reduced in size. The compactor 150 may be powered by a connection to the power source of the vehicle 10.

The control unit 160 may be connected to the waste receiving container 110, the waste storage container 120, the air dispensing unit 140, and/or the compactor 150, but is not limited thereto.

The control unit 160 may include a lid control button 161, an air control button 162, and a compactor button 163, but is not limited thereto.

The lid control button 161 may open the first lid 112 and/or the second lid 113 in response to depressing the lid control button 161 a first time, and close the first lid 112 and/or the second lid 113 in response to depressing the lid control button 161 a second time.

The air control button 162 may turn on the air dispensing unit 140 in response to depressing the lid control button 161 a first time, and turn off the air dispensing unit 140 in response to depressing the air control button 162 a second time.

The compactor button 163 may turn on the compactor 150 in response to depressing the compactor button 163 a first time, and turn off the compactor 150 in response to depressing the compactor button 163 a second time.

Therefore, the vehicle waste disposal system 100 may facilitate disposal of the at least one waste item within the vehicle 10. Moreover, the vehicle waste disposal system 100 may protect the environment by providing people within the vehicle 10 a means to dispose of waste in a convenient manner.

The present general inventive concept may include a vehicle waste disposal system 100 connected to a vehicle 10, the vehicle waste disposal system 100 including a waste receiving container 110 connected within a passenger compartment of the vehicle 10 to receive at least one waste item therein, a waste storage container 120 connected within a trunk of the vehicle 10 to receive the at least one waste item from the waste receiving container 110 and store the at least one waste item therein, a pipe 130 connected at a first end to at least a portion of the waste receiving container 110 and connected at a second end to at least a portion of the waste storage container 120, and an air dispensing unit 140 connected to at least a portion of the waste receiving container 110 and the pipe 110 to move the at least one waste item from the waste receiving container 110 to the waste storage container 120 in response to extracting air from the waste receiving container 110 and expelling the air into the pipe 130 toward the waste storage container 120.

The waste storage container 120 may include a sensor 123 to detect a volume of the at least one waste item within the waste storage container 120 and prevents the waste storage container 120 from receiving another at least one waste item until the waste storage container 120 is emptied.

The sensor 123 may disable the air dispensing unit 140 from operating in response to the sensor 123 detecting the waste storage container 120 is full.

The vehicle waste disposal system 100 may further include a compactor 150 disposed within at least a portion of the waste storage container 120 to compress the at least one waste item within the waste storage container 120.

The vehicle waste disposal system 100 may further include a control unit 160 connected to the waste receiving container 110 to control at least one of the waste receiving container 110, the air dispensing unit 140, and the compactor 150.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A vehicle waste disposal system connected to a vehicle, the vehicle waste disposal system comprising:
   a waste receiving container connected within a passenger compartment of the vehicle to receive at least one waste item therein;
   a waste storage container connected within a trunk of the vehicle to receive the at least one waste item from the waste receiving container and store the at least one waste item therein;
   a pipe connected at a first end to at least a portion of the waste receiving container and connected at a second end to at least a portion of the waste storage container; and an air dispensing unit connected to at least a portion of the waste receiving container and the pipe to move the at least one waste item from the waste receiving container to the waste storage container in response to extracting air from the waste receiving container and expelling the air into the pipe toward the waste storage container.

2. The vehicle waste disposal system of claim 1, wherein the waste storage container comprises a sensor to detect a volume of the at least one waste item within the waste storage container and prevents the waste storage container from receiving another at least one waste item until the waste storage container is emptied.

3. The vehicle waste disposal system of claim 2, wherein the sensor disables the air dispensing unit from operating in response to the sensor detecting the waste storage container is full.

4. The vehicle waste disposal system of claim 1, further comprising:
   a compactor disposed within at least a portion of the waste storage container to compress the at least one waste item within the waste storage container.

5. The vehicle waste disposal system of claim 1, further comprising:
   a control unit connected to the waste receiving container to control at least one of the waste receiving container, the air dispensing unit, and the compactor.

\* \* \* \* \*